3,324,072
NYLON FILLED WITH CARBON BLACK
Edmond P. Brignac, Pensacola, Fla., assignor to Monsanto Company, a corporation of Delaware
No Drawing. Filed Aug. 12, 1963, Ser. No. 301,648
15 Claims. (Cl. 260—37)

The present invention relates to nylon compositions containing finely divided and specially treated carbon black and to a method of preparing such compositions.

It is, of course, well known to produce filaments prepared from nylon having carbon black evenly distributed therein. Filaments prepared from nylon filled with carbon black offer many processing advantages over filaments dyed after their formation. Some of these advantages are color fastness and uniformity. Although various ways have been suggested for mixing or working carbon black into nylon to form a good dispersion thereof, filaments or similar strand-like material melt spun from carbon-containing nylon exhibit notably inferior physical properties, particularly in regard to tensile strength. The reduction in strength is greater than would be expected when one considers the effect of the addition of other extraneous materials to nylon, as for example heat stabilizing agents, light stabilizing agents, anti-foaming agents, viscosity stabilizers and delustrants.

Prior proposals for pigmenting nylon employed commercially available carbon blacks. Analyses of the various types of the commercial black pigments indicate that the molecular oxygen content thereof may be as high as 12 percent by weight. In this connection, reference is made to Industrial and Engineering Chemistry, vol. 48, page 162, January 1956. Of that total molecular oxygen content, about 18 percent is considered to be present in 1,4-quinone form; and about 5 to 19 percent is present in carboxyl groups. Also, for every 3.2 oxygen atoms found in carboxyl groups, there is apparently one oxygen present in the form of phenolic groups. In some uses, such as the reinforcement of rubber compounds, the presence of molecular oxygen in carbon blacks is quite beneficial. However, it has been observed that conventional carbon blacks are poor materials for pigmenting nylon melts. Such black pigments adversely influence the physical properties of filaments and the like made therefrom.

It is an object of the present invention to provide a black pigmented nylon suitable for melt spinning into filaments of satisfactory physical properties.

It is a further object of the present invention to provide a nylon filament pigmented with specially treated carbon blacks.

It is another object to provide a process of preparing black pigmented nylon suitable for melt spinning into filaments.

Other objects may become apparent.

In accordance with the present invention, it has been found that carbon black treated so that the molecular oxygen content thereof is below 3.0 weight percent can be more easily incorporated in nylon by intimately mixing those two materials together, and that the resulting pigmented nylon can be melt spun into textile filaments of excellent quality. Preferably, the oxygen content of the carbon black is 0.05–2.5 weight percent at the time the same is incorporated in the nylon.

Nylon is a well-known substance and is prepared by polycondensation of dicarboxylic acids and diamines or by polycondensation of amino acids to provide high molecular weight polymers. Particularly desirable nylon is prepared by the polycondensation of hexamethylene diamine and adipic acid or by the polycondensation of 6-aminocaproic acid. Also, the present invention is concerned with pigmenting nylon polymer blends and copolymers.

It is necessary to the practice of the invention that the carbon black when incorporated in the nylon have less than 3.0 percent molecular oxygen content. This means that many ordinary carbon blacks must be treated before being incorporated in a manner that the oxygen content thereof is reduced below the 3.0 percent level.

Several ways have been found suitable for achieving the required low oxygen content in the carbon blacks. One preferred method of lowering the oxygen content of the carbon blacks involves heating the material in an atmosphere of hydrogen in the presence of platinum oxide. Another method involves intimately contacting the carbon black with about 2–4 percent diazomethane in absolute ether. A third method is a prolonged treatment of the black pigment at about 1000° C. in a stream of nitrogen gas or under a vacuum.

The treated carbon black having an average particle size of 5–70 millimicrons can be incorporated into nylon in various conventional ways. Dispersion of the carbon blacks having the low molecular oxygen content can be more easily accomplished in amounts of about 0.05–10 percent by weight. Untreated carbon blacks tend to form agglomerates; and expensive and time consuming steps are required to minimize the agglomerate formation. It is quite surprising that treated carbon blacks do not tend to form such agglomerates.

One preferred way of dispersing the treated carbon blacks through nylon involves mixing these materials thoroughly while the nylon is in a molten condition. However, the black pigments can be added during or before polycondensation of the nylon-forming material commences.

Another important method involves tumbling chips of nylon and finely divided carbon black and thereafter melting the resulting coated nylon chips. The molten nylon is then extruded into uniformly black colored filaments of high quality. Articles can be molded from the black nylon; films and bristles can be extruded therefrom; and surfaces can be coated therewith.

For a more detailed description of the invention, reference is made to the following specific examples. The examples are illustrative and not limitative. All parts and percentages are by weight unless otherwise indicated.

Example I

Carbon black having a molecular oxygen content of 12 percent was added to a stream of molten fiber-grade nylon-66 polymer. The amount of pigment was such that the mixture contained 1.0 percent pigment. The resulting stream was passed through a gear pump and then through the orifices of a melt-spinning spinneret to produce a bundle of 140 filaments. The filaments were drawn to a total denier of 840. Many breaks in the filaments occurred during the drawing. A close analysis of the yarn showed the presence of agglomerates of carbon black indicating a poor dispersion of the pigment in the polymer. The tenacity of the yarn was only 2.5 grams per denier.

Example II

The carbon black of the first example was heated in a nitrogen atmosphere at 1000° C. for approximately 150 minutes. At the end of the treatment, analysis of the sample showed it to have a molecular oxygen content of 0.25 percent. The carbon black so treated was added to a stream of molten fiber-grade nylon-66 polymer. The amount of black pigment was such that the mixture contained 1.0 percent pigment. The resulting stream was passed through a gear pump and then through the orifices of a melt-spinning spinneret to produce a bundle of 140 filaments. The filaments were drawn to a total denier of 840. Very few breaks in the filaments occurred during the drawing. A close analysis of the yarn showed the presence of substantially no agglomerates of carbon black indicating an excellent dispersion of the pigment in the polymer. The tenacity of the yarn was 6.5 grams per denier.

Similar improvements are found when nylon-6 is pigmented with carbon black of low molecular oxygen content and when the oxygen content of the black is reduced in other ways.

Thus, it is seen that the present invention provides numerous advantages. There is provided a convenient process for the production of carbon-filled nylon. The black pigment is more easily dispersed in nylon. Less agglomerate formation is experienced when the treated black pigment is incorporated in nylon.

As many different embodiments of this invention can be made without departing from the spirit and scope thereof, it is to be understood that the invention is not limited to the above specific embodiments except as defined in the following claims.

What is claimed is:

1. A process for preparing black pigmented nylon which comprises treating carbon black normally characterized by an oxygen content substantially higher than 3 weight percent to lower the oxygen content thereof to below 3 weight percent, and mixing the treated carbon black with nylon to form a substantially uniform mixture thereof.

2. The process of claim 1 wherein the oxygen content of the carbon black is lowered to 0.05–2.5 weight percent.

3. A process for preparing black pigmented nylon filaments which comprises treating carbon black normally characterized by an oxygen content substantially higher than 3 weight percent to lower the oxygen content thereof to below 3 weight percent, mixing the treated carbon black with molten nylon to form a substantially uniform mixture thereof, and melt spinning the resulting mixture into filaments.

4. The proces of claim 3 wherein the oxygen content of the carbon black is lowered to 0.05–2.5 weight percent.

5. A composition of matter comprising a substantially uniform mixture of fiber-grade nylon and finely divided carbon black provided by treating carbon black normally characterized by an oxygen content substantially higher than 3 weight percent to lower the oxygen content thereof to below 3 weight percent.

6. The process of claim 1 wherein the carbon black in the resulting mixture is present in an amount of 0.05–10 weight percent.

7. The process of claim 1 wherein the nylon is nylon-66.

8. The process of claim 1 wherein the nylon is nylon-6.

9. The process of claim 3 wherein the carbon black in the mixture is present in an amount of 0.05–10 weight percent.

10. The process of claim 3 wherein the nylon is nylon-66.

11. The process of claim 3 wherein the nylon is nylon-6.

12. The composition of claim 5 wherein the oxygen content of the finely divided carbon black is 0.05–2.5 weight percent.

13. The composition of claim 5 wherein the mixture contains 0.05–10 weight percent carbon black.

14. The composition of claim 5 wherein the nylon is nylon-66.

15. The composition of claim 5 wherein the nylon is nylon-6.

References Cited

UNITED STATES PATENTS

| | | | |
|---|---|---|---|
| 2,066,274 | 12/1936 | Grote | 23—209.9 |
| 2,345,533 | 3/1944 | Graves. | |
| 2,495,925 | 1/1950 | Foster et al. | 23—209.9 |

OTHER REFERENCES

SPE Journal, March 1965, p. 248 and 249 (Droggin).
Condensed Chemical Dictionary, Rose, 6th ed., 1961, p. 218.

MORRIS LIEBMAN, *Primary Examiner.*

J. W. BEHRINGER, J. FROME, *Assistant Examiners.*